Patented Apr. 12, 1927.

1,624,088

UNITED STATES PATENT OFFICE.

ARTHUR BIDDLE, OF TRENTON, NEW JERSEY, ASSIGNOR TO UNITED PRODUCTS CORPORATION OF AMERICA, A CORPORATION OF DELAWARE.

COMPOSITION OF GUM CHICLE DISPERSED IN AN AQUEOUS COLLOID.

No Drawing.    Application filed May 11, 1926. Serial No. 108,424.

My invention relates to the dispersing of gum chicle in an aqueous colloid.

Among the objects of my invention is to provide a coating or lacquer which may be used to coat metallic surfaces.

Another object is to provide a sealing compound for containers.

Another object of my invention is to provide an adhesive like composition suitable for use as a binder for fibrous materials and comminuted substances, such as cork and leather, and in which a certain degree of softness or plasticity is desired in the finished product.

Another object of my invention is to provide a composition suitable for use as a coating or sizing for fabrics and fibrous materials and capable of forming a surface thereon which has waterproof properties.

In carrying out my invention heat is preferably first applied to the chicle, with or without pressure, and an aqueous mixture of colloid is added thereto, the whole being constantly agitated. Among the colloids which may be used in my new composition of matter are colloidal clays, such as china clay and bentonite; stearates, such as sodium stearate; proteins such as casein in solution; albumens; carbohydrates, such as cornstarch or cassava meal or flour; soluble silicates, and soaps. In order to make the aqueous solution more stable, the addition of an alkali may be advantageous, especially so when the material to which it is to be applied to or used with is of an acid or acid reacting nature which might cause premature coagulation or precipitation of the composition. For certain compositions the chicle may be first added to an oil, either heavy, volatile, semi-drying or oxidizing, or tars, pitches, waxes or resins; volatile oils may be used when it is desired that oil be not present in the finished product; when heavy, semi-drying or oxidizing oils, tars, pitches, waxes or resins are used they will be retained in the finished product, which will make it more adaptable for certain uses.

As an example of one form of my new composition which I have found useful as a sealing compound, I give the following formula:

|  | Parts by weight. |
|---|---|
| Chicle to which oil has been added (50% chicle content) | 150 |
| Bentonite clay in water (20% dry clay content) | 60 |

Water added as may be suitable.

As an example of another form of my new composition which I have found useful as a coating compound or lacquer for metallic surfaces and the like, I give the following formula:

|  | Parts by weight. |
|---|---|
| Gum chicle | 100 |
| Cumar or other suitable resin | 300 |
| Sodium stearate or other insoluble stearate | 50 |
| Bentonite clay | 20 |

Water added as may be suitable.

In this example the stearate-clay combination acts as the supporting or protective colloid.

As an example of one form of my new composition which I have found useful as a flexible coating or sizing, I give the following formula:

|  | Parts by weight. |
|---|---|
| Gum chicle in linseed oil (50% chicle content) | 100 |
| Casein solution (20% casein content) | 100 |
| Zinc oxide | 5 |
| China clay or satin white (neutral or slightly alkaline) | 20 |
| Formaldehyde (50% solution) | ¼ |

Water added as may be suitable.

I have found that a composition suitable for use as a binder may be obtained by omitting from the above formula the oil and clay.

It will be understood that the foregoing formulas are set forth by way of example only and that my invention is not restricted to the particular ingredients and proportions stated. Due to the varying degrees of purity and physical and chemical irregularities, the proportions stated may have to be altered; furthermore, the proportions will vary with the particular uses to which the final products are to be put.

My new composition may be made plastic, suitable for use as molding compounds or to be applied as plastic coatings, by adding fillers, such as comminuted cork or leather, and fibrous material, such as cellulose, asbestos, paper stock or other fibrous material. The colloids in my new composition may, if desired, when the composition is to be used, for example as a coating, be preferably made insoluble after the water has once been removed by adding to the composition an insolubilizing agent; for example, if casein is used as the colloid, formaldehyde may be added, or if starches, thin flowing, alkali treated or otherwise, are used, an insolubilizing agent, such as zinc chloride, may be used, or if bone, hide or similar glues are used, such insolubilizing agents as formaldehyde, acid reacting metallic salts, tannates or tannic acid may be used. Sulphur or sulphur compounds, such as hydrosulphurette of ammonia, antimony sulphide and sulphur chloride, in proportions of 2% to 10% of the chicle content, dependent on the degree of flexibility desired, may also be advantageously used, their action being promoted by heat when desirable, in my new composition in some instances for their insolubilizing and/or vulcanizing properties. Where extreme brittleness or hardness is an essential quality in the finished product, the sulphur or sulphur contents may be used in even larger proportions. The amount of sulphur compounds which are used is, of course, dependent on their respective sulphur content.

Inasmuch as gum chicle becomes softened under heat, it may be mixed with the colloid, not only by immersing the same in an aqueous solution thereof while being vigorously agitated therewith, but also the softened gum chicle may be mixed with the colloidal substance by milling, rolling, masticating or otherwise, and if desired a non-oxidizing or non-drying oil may be added to make the mass more workable.

While I have herein described modes of carrying out my invention and have set forth certain formulas to produce certain compositions useful in a few of the arts, it is to be understood that the invention is not limited to those arts or to the modes stated or to the particular ingredients and proportions thereof.

Having thus described my invention, I claim and desire to protect by Letters Patent of the United States:

1. A composition of matter comprising an aqueous dispersion of gum chicle and a hydrophilic colloid.

2. A composition of matter comprising an aqueous dispersion of gum chicle, a hydrophilic colloid and a filling material.

3. A composition of matter comprising an aqueous dispersion of gum chicle, a hydrophilic colloid and sulphur.

4. A composition of matter comprising an aqueous dispersion of gum chicle, a hydrophilic colloid, an alkali and a filling material.

5. A composition of matter comprising an aqueous dispersion of gum chicle, casein, an alkali and a sulphur containing substance.

6. A composition of matter comprising an aqueous dispersion of gum chicle, a hydrophilic colloid and an insolubilizing agent for said colloid.

7. An adhesive like composition of matter comprising an aqueous dispersion of gum chicle, a hydrophilic colloid and an insolubilizing agent to render said dispersion insoluble in water after drying.

8. A composition of matter comprising an aqueous dispersion of gum chicle, a hydrophilic colloid and softening agents.

9. A composition of matter comprising an aqueous dispersion of gum chicle, resin, a hydrophilic colloid and filling materials.

10. A composition of matter comprising an aqueous dispersion of gum chicle, an oil, and a hydrophilic colloid.

11. A composition of matter comprising an aqueous dispersion of gum chicle, an oil bearing material and a hydrophilic colloid.

12. A composition of matter comprising an aqueous dispersion of gum chicle, which has been subjected to the action of a volatile oil and a hydrophilic colloid.

In witness whereof, I have hereunto set my hand this 10th day of May, 1926.

ARTHUR BIDDLE.